United States Patent
Venkataramani et al.

(10) Patent No.: US 9,803,484 B2
(45) Date of Patent: Oct. 31, 2017

(54) ARTICLES FOR HIGH TEMPERATURE SERVICE AND METHOD FOR MAKING

(71) Applicant: GENERAL ELECTRIC COMPANY, Schenectady, NY (US)

(72) Inventors: Venkat Subramaniam Venkataramani, Clifton Park, NY (US); Shahana Chatterjee, Bangalore (IN); Mohandas Nayak, Bangalore (IN); Shankar Sivaramakrishnan, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 113 days.

(21) Appl. No.: 14/576,760

(22) Filed: Dec. 19, 2014

(65) Prior Publication Data

US 2016/0177746 A1 Jun. 23, 2016

(51) Int. Cl.
| | |
|---|---|
| *C01G 25/00* | (2006.01) |
| *C01G 35/00* | (2006.01) |
| *F01D 5/28* | (2006.01) |
| *C01G 33/00* | (2006.01) |

(52) U.S. Cl.
CPC .............. *F01D 5/288* (2013.01); *C01G 25/00* (2013.01); *C01G 33/00* (2013.01); *C01G 35/00* (2013.01); *C01P 2002/34* (2013.01); *F05D 2300/2112* (2013.01); *Y02T 50/672* (2013.01)

(58) Field of Classification Search
None
See application file for complete search history.

(56) References Cited

U.S. PATENT DOCUMENTS

| | | | |
|---|---|---|---|
| 7,226,668 B2 | 6/2007 | Nagaraj et al. | |
| 7,326,468 B2 | 2/2008 | Spitsberg et al. | |
| 7,374,825 B2 | 5/2008 | Hazel et al. | |
| 7,638,178 B2 | 12/2009 | Raybould et al. | |
| 8,084,086 B2 | 12/2011 | Hass et al. | |
| 8,470,460 B2 | 6/2013 | Lee | |
| 2006/0099358 A1* | 5/2006 | Raybould | C04B 41/009 428/34.1 |
| 2007/0160859 A1 | 7/2007 | Darolia et al. | |
| 2010/0327213 A1* | 12/2010 | Tolpygo | C04B 35/488 252/62 |

(Continued)

OTHER PUBLICATIONS

Ebisu et.al. J. Phys. Chem. Sol. 61 (2000), 45-65.*

(Continued)

*Primary Examiner* — Vera Katz
(74) *Attorney, Agent, or Firm* — John P. Darling

(57) ABSTRACT

Articles, such as components for high temperature turbomachinery components, include one or more coatings bearing certain perovskite compositions resistant to incursion by liquid calcium-magnesium-aluminum-silicon-oxide (CMAS) materials during service. The CMAS-reactive material includes a perovskite-structured oxide, which comprises a) a rare earth element, b) niobium, tantalum or a combination of tantalum and niobium, and c) oxygen. The CMAS-reactive material is present in an effective amount to react with a CMAS composition at an operating temperature, thereby forming a reaction product having one or both of melting temperature and viscosity greater than that of the CMAS composition.

12 Claims, 1 Drawing Sheet

(56) References Cited

U.S. PATENT DOCUMENTS

Figure 1:
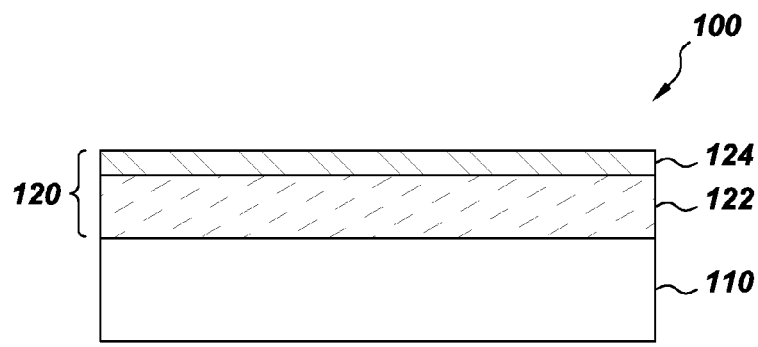

2011/0300357 A1* 12/2011 Witz .................. C23C 4/02
                                                       428/213
2013/0130052 A1   5/2013 Menuey et al.
2016/0168684 A1*  6/2016 Brosnan ............. C23C 4/127
                                                     428/305.5

OTHER PUBLICATIONS

Kim et.al. J. Am. Ceram. Soc. 74, 12 (1991), 3061-3065.*
Jiang et al. Materials Letters 79 (2012), 248-251.*
Downs et al., "Suppressing CMAS attack with a MoSiB-based coating", Surface and Coatings Technology, Science Direct, vol. 239, pp. 138-146, Jan. 25, 2014.
Ramachandran et al., "Thermal cycling behaviour of plasma sprayed lanthanum zirconate based coatings under concurrent infiltration by a molten glass concoction", Ceramics International, Science Direct, vol. 39, Issue 2, pp. 1413-1431, Mar. 2013.
Machine translation of Japanese published application 2012-283602 publication No. 2014-125656 published Jul. 7, 2014.

* cited by examiner

ARTICLES FOR HIGH TEMPERATURE SERVICE AND METHOD FOR MAKING

BACKGROUND

This disclosure generally relates to articles employing thermally protective coatings. More particularly, this disclosure relates to articles employing coatings that are resistant to degradation due to high-temperature interactions with dust materials.

Thermal barrier coatings are typically used in articles that operate at or are exposed to high temperatures. Aviation turbines and land-based turbines, for example, may include one or more components protected by the thermal barrier coatings. Under normal conditions of operation, coated components may be susceptible to various types of damage, including erosion, oxidation, and attack from environmental contaminants.

For turbine components, environmental contaminant compositions of particular concern are those containing oxides of calcium, magnesium, aluminum, silicon, and mixtures thereof; dirt, ash, and dust ingested by gas turbine engines, for instance, are often made up of such compounds. These oxides often combine to form contaminant compositions comprising mixed calcium-magnesium-aluminum-silicon-oxide systems (Ca—Mg—Al—Si—O), hereafter referred to as "CMAS." At the high turbine operating temperatures, these environmental contaminants can adhere to the hot thermal barrier coating surface, and thus cause damage to the thermal barrier coating. For example, CMAS can form compositions that are liquid or molten at the operating temperatures of the turbines. The molten CMAS composition can dissolve the thermal barrier coating, or can fill its porous structure by infiltrating the pores, channels, cracks, or other cavities in the coating. Upon cooling, the infiltrated CMAS composition solidifies and reduces the coating strain tolerance, thus initiating and propagating cracks that may cause delamination and spalling of the coating material. This may further result in partial or complete loss of the thermal protection provided to the underlying substrate of the part or component. Further, spallation of the thermal barrier coating may create hot spots in the substrate leading to premature component failure. Premature component failure can lead to unscheduled maintenance as well as parts replacement resulting in reduced performance, and increased operating and servicing costs.

Thus, there is a need for improved coating systems that provide protection to thermal barrier coatings from the adverse effects of environmental contaminants, when operated at or exposed to high temperatures. In particular, there is a need for improved coating systems, and methods for making such coatings, that provide protection from the adverse effects of deposited CMAS.

BRIEF DESCRIPTION

Embodiments of the present invention are provided to meet this and other needs. One embodiment is an article comprising a substrate and a plurality of coatings disposed on the substrate. The plurality of coatings includes a thermal barrier coating disposed over the substrate, and a protective coating comprising a calcium-magnesium-aluminum-silicon-oxide (CMAS)-reactive material disposed over the thermal barrier coating. The CMAS-reactive material includes a perovskite-structured oxide, which comprises a) a rare earth element, b) niobium, tantalum or a combination of tantalum and niobium, and c) oxygen. The CMAS-reactive material is present in the plurality of coatings in an effective amount to react with a CMAS composition at an operating temperature of the thermal barrier coating, thereby forming a reaction product having one or both of melting temperature and viscosity greater than that of the CMAS composition.

Another embodiment is an article comprising a substrate and a coating disposed over the substrate. The coating comprises a plurality of phases, and the plurality of phases includes a first phase having a perovskite-structured oxide, the oxide comprising a) a rare earth element, b) niobium, tantalum or a combination of tantalum and niobium, and c) oxygen; and a second phase comprising an oxide. The second phase has a crystal structure different from the first phase.

Another embodiment is an article comprising a protective coating disposed on a substrate. The coating comprises a perovskite-structured oxide having a nominal composition of $AB_3O_9$, where A comprises gadolinium and B comprises niobium, tantalum or a combination of tantalum and niobium. The total amount of tantalum and niobium in the perovskite-structured oxide is present in a molar ratio to A of at least 1.

DRAWINGS

These and other features, aspects, and advantages of the present invention will become better understood when the following detailed description is read with reference to the accompanying drawing in which like characters represent like parts, wherein:

FIGS. 1-4 illustrate schematic cross-sections of various articles in accordance with embodiments of the present invention.

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As used herein, the term "coating" refers to a material disposed on at least a portion of an underlying surface in a continuous or discontinuous manner. Further, the term "coating" does not necessarily mean a uniform thickness of the disposed material, and the disposed material may have a uniform or a variable thickness. The term "coating" may refer to a single layer of the coating material or may refer to a plurality of layers of the coating material. The coating material may be the same or different in the plurality of layers. As used herein, the term "disposed on" refers to layers or coatings disposed directly in contact with each other or indirectly by having intervening layers there between, unless otherwise specifically indicated. The term "adjacent" as used herein means that the two layers or coatings are disposed contiguously and are in direct contact with each other.

As mentioned earlier, thermal barrier coatings are susceptible to molten CMAS compositions at high turbine operating temperatures. The molten CMAS composition can dissolve the thermal barrier coating, or can infiltrate its porous structure by infiltrating the pores, channels or other cavities in the coating. Upon cooling, the infiltrated CMAS composition solidifies and reduces the coating strain tolerance, thus initiating and propagating cracks that may cause delamination and spalling of the coating material. Previous methods to protect the thermal barrier coatings include use of CMAS-reactive or CMAS-resistant thermal barrier coating compositions. However, the previously known CMAS-reactive compositions may not provide the desired CMAS-reactivity.

The term "CMAS" or "CMAS composition" as used herein refers to a contaminant composition including calcium, magnesium, aluminum and silicon. In some embodiments, the CMAS composition primarily includes a mixture of magnesium oxide, calcium oxide, aluminum oxide and silicon oxide. A non-limiting example of a CMAS composition includes calcium oxide present in an amount in a range from about 1 weight percent to about 60 weight percent of the total CMAS composition; magnesium oxide present in an amount in a range from about 0 weight percent to about 20 weight percent of the total CMAS composition; aluminum oxide present in an amount in a range from about 10 weight percent to about 30 weight percent of the total CMAS composition; and silicon oxide present in an amount in a range from about 20 weight percent to about 80 weight percent of the total CMAS composition.

In some embodiments, other elements, such as nickel, iron, titanium and chromium, may also be present in the CMAS composition. In such instances, the additional elements may be present in a small amount, for example, less than about 10 weight percent of total amount of CMAS composition present. In some such instances, the CMAS composition may include about 29 wt % calcium oxide, about 7 wt % magnesium oxide, about 11 wt % aluminum oxide, and about 43 wt % silicon oxide. Further, the composition may include about 2 wt % nickel oxide, about 8 wt % iron oxide, and small amounts of titanium oxide and chromium oxide, such that the total weight percentage of these elements is less than 10 wt %. The CMAS composition may have a melting temperature less than about 1315° C. (2399° F.) in some embodiments, and less than about 1227° C. (2240° F.) in some other embodiments.

The particular compositional characteristics of the CMAS composition may depend on the source of the environmental contaminants and the reaction temperature. The CMAS composition is typically formed at operational temperatures of about 1000° C. (1832° F.) or more. Sources of CMAS composition include, but are not limited to, sand, dirt, volcanic ash, fly ash, cement, runway dirt, fuel and air sources, oxidation and wear products from engine components, or combinations thereof.

As used herein, the term "CMAS-reactive material" refers to a material capable of reacting with a CMAS composition to form a reaction product having one or both of melting temperature and viscosity greater than that of the CMAS composition. In some instances, the reaction product may form a glassy (typically thin) protective layer that the CMAS deposits may be less able to adhere to or infiltrate.

Embodiments of the invention described herein address the shortcomings of the state of the art as noted previously. Some embodiments present an article including a substrate and a plurality of coatings disposed on the substrate. The plurality of coatings includes a thermal barrier coating disposed on the substrate; and a protective coating including a calcium-magnesium-aluminum-silicon-oxide (CMAS)-reactive material disposed on the thermal barrier coating. The CMAS-reactive material includes an oxide having a perovskite-type crystal structure. The oxide is referred to herein as "a perovskite-structured oxide." The CMAS-reactive material is present in the plurality of coatings in an effective amount to react with a CMAS composition at an operating temperature of the thermal barrier coating, thereby forming a reaction product having one or both of melting temperature and viscosity greater than that of the CMAS composition; the amount is "effective" when it is of sufficient concentration that its reaction product would, upon exposure to CMAS material, form a substantial local barrier to further CMAS incursion into the coating. In some embodiments, the protective coating comprises at least about 20 percent by volume of the perovskite-structured oxide.

In accordance with some of the embodiments of the invention, the protective coating may protect the thermal barrier coating by undergoing one or both of chemical and physical changes when in contact with a CMAS composition. The protective coating may be disposed on the thermal barrier coating such that the protective coating overlies the thermal barrier coating. In certain embodiments, the overlay protective coating is disposed adjacent to, that is, in immediate contact with, the thermal barrier coating.

As noted above, the CMAS-reactive material includes an oxide having a perovskite-type crystal structure typically of the general formula $ABX_3$, where A and B are respectively large and small cations occupying the 12 and 6 coordinated sites and X is the anion such as O. Generally, the sum of the charges of the A and B ions is six in a defect-free perovskite structure. In certain cases where the sum of charges is not equal to six, the composition may still maintain a perovskite structure form with compensatory vacancies in the A and/or B and/or X sites. For example, in the case of a large trivalent ion such as gadolinium (Gd) in the A site and a smaller pentavalent ion such as tantalum (Ta) in the B-site and oxygen (O) forming a perovskite phase, the formula may be represented by $AB_3O_9$, which is 3 times the unit cell of a simple perovskite, but with 1 A ion and 2 vacancies in the A-sites per unit cell.

The perovskite-structured oxide included in the aforementioned CMAS-reactive material includes a) a rare earth element, b) niobium, tantalum or a combination of tantalum and niobium, and c) oxygen. Material of this type has been found by the present inventors to exhibit attractive reactivity with CMAS materials under environmental conditions of interest for turbo-machinery applications. In particular embodiments, the rare earth component of the oxide comprises gadolinium; perovskite oxide bearing this element and tantalum, for example gadolinium tantalate (such as the oxide having nominal formula $GdTa_3O_9$), has been observed by the inventors to promote the formation of stable crystalline products upon reaction with CMAS. Based on this observation, perovskite oxide that includes gadolinium and niobium, for example gadolinium niobate (such as nominal composition $GdNb_3O_9$), is expected to behave similarly to the gadolinium-tantalum-bearing perovskite, and certain embodiments of the present invention include the use of such oxide in the protective coating.

In certain embodiments, the perovskite-structured oxide has a nominal composition of $AB_3O_9$, where A comprises the rare earth element, and B comprises tantalum and/or niobium. The perovskite crystal structure associated with compositions of this type is sometimes referred to in the art as a "defective perovskite structure" because, as noted above, the unit cell structure includes 2 vacancies on the A sites along with the one A cation. In the present description this structure is simply referred to as a perovskite. As used herein, the term "rare earth element" encompasses elements of the lanthanide series, yttrium, and scandium. The $AB_3O_9$ composition is described as "nominal" in that some substitution of different elements at the crystal lattice A-sites, B-sites, and/or O sites should be understood as being encompassed by the composition as described. For example, some amount of fluorine, nitrogen, or other suitable anion may be substituted for the oxygen at the O site, and the resulting material is considered within the scope of the nominal composition, so long as the resultant material retains reactivity with CMAS-type materials. As another example, in some embodiments employing nominal $AB_3O_9$, the A component further comprises an alkaline earth element, such as calcium, barium, or strontium. Moreover, in some embodiments the B component of the nominal composition given above further comprises a transition metal element, exclusive of the rare earth elements. Suitable examples include zirconium, hafnium, tungsten, molybdenum, and combinations of these. The abovementioned substitutions in the composition can beneficially enhance the required performance characteristics such as resistance to CMAS, higher phase stability, higher coefficient of thermal expansion, lower thermal conductivity and higher toughness.

Those skilled in the art will appreciate that substitution of various components within the perovskite, such as those noted above, may be suitable so long as certain constraints such as charge compensation and lattice geometrical considerations can be met to maintain a perovskite crystal structure. For instance, where substitution of one or more cation sites (or filling one or more vacant sites) would result in a charge imbalance if the "$O_9$" stoichiometry were maintained, the composition of the oxide may shift to include slightly less oxygen to compensate for the apparent imbalance.

Perovskite oxides of the type described herein that contain a substantial amount of tantalum have been shown to possess particularly desirable levels of reactivity with CMAS material. Thus, in some embodiments, the tantalum is present in the nominal $AB_3O_9$ oxide (at B sites) in a molar ratio to A of at least 1.

In some embodiments, the CMAS-reactive material is present in the protective coating at a concentration such that the melting temperature of the reaction product created with an impingent CMAS composition is at least the surface temperature of the protective coating. In some embodiments, the CMAS-reactive material is present in the protective coating at a concentration such that the melting temperature of the reaction product is at least 10° C. above the surface temperature of the protective coating during its operation. In some embodiments, the CMAS-reactive material is present in the protective coating such that the melting temperature of the reaction product is at least about 40° C. above the surface temperature of the protective coating during its operation. Thus, by way of an example, if the surface temperature of the protective coating during operation is about 1230° C., then the CMAS-reactive material is present in amount such that the melting temperature of the reaction product is at least about 1240° C.

In some embodiments, the CMAS-reactive material is present in the protective coating at a concentration such that the viscosity of the reaction product is at least about 10 centipoise above the viscosity of an impingent CMAS composition, at the operating temperature of the thermal barrier coating. In some embodiments, the CMAS-reactive material is present in the protective coating at a concentration such that the viscosity of the reaction product is about 10 centipoise to about 1000000 centipoise above the viscosity of the impingent CMAS composition, at the operating temperature of the thermal barrier coating.

The protective coating may be further characterized by the thickness, and may have a thickness such that the effective amount of the CMAS-reactive material is present in the plurality of coatings. In some embodiments, the protective coating has a thickness in a range from about 10 microns to about 1000 microns. In some embodiments, the protective coating has a thickness in a range from about 25 microns to about 500 microns. In some embodiments, the protective coating has a thickness in a range from about 50 microns to about 100 microns.

The protective coating may include the CMAS-reactive material in an amount of up to 100 weight percent, and sufficient to protect the thermal barrier coating at least partially against deposited CMAS. In some embodiments, the protective coating consists essentially of the CMAS-reactive material. The term "consists essentially" as used herein means that the protective coating includes less than 10 volume percent of material other than the CMAS-reactive material that may alter the properties of the protective coating (for example, CTE). In certain embodiments, the protective coating includes less than about 10 volume percent of the thermal barrier coating material (for example, ceramic thermal barrier coating material).

As used herein, the term "thermal barrier coating" refers to a coating include a material capable of reducing heat flow to the underlying substrate of the article, that is, forming a thermal barrier. In some embodiments, the thermal barrier coating includes a material having a melting point greater than about 1090° C. In some embodiments, the thermal barrier coating includes a material having a melting point greater than about 1200° C. In some embodiments, the thermal barrier coating includes a material having a melting point in a range from about 1200° C. to about 1930° C.

In some embodiments, the thermal barrier coating includes a ceramic thermal barrier material. Suitable ceramic thermal barrier coating materials include various types of oxides, such as hafnium oxide ("hafnia") or zirconium oxide ("zirconia"), in particular stabilized hafnia or stabilized zirconia, and blends including one or both of these. Examples of stabilized zirconia include without limitation yttria-stabilized zirconia, ceria-stabilized zirconia, calcia-stabilized zirconia, scandia-stabilized zirconia, magnesia-stabilized zirconia, india-stabilized zirconia, ytterbia-stabilized zirconia, lanthana-stabilized zirconia, gadolinia-stabilized zirconia, as well as mixtures of such stabilized zirconia. Similar stabilized hafnia compositions are known in the art and suitable for use in embodiments described herein.

In certain embodiments, the thermal barrier coating includes yttria-stabilized zirconia. Suitable yttria-stabilized zirconia may include from about 1 weight percent to about 20 weight percent yttria (based on the combined weight of yttria and zirconia), and more typically from about 3 weight percent to about 10 weight percent yttria. An example yttria-stabilized zirconia thermal barrier coating includes about 7% yttria and about 93% zirconia. These chemically stabilized zirconia may further include one or more of a second metal oxide such as dysprosia, erbia, europia, gadolinia, neodymia, praseodymia, urania, and hafnia to further reduce thermal conductivity of the thermal barrier coating. In some embodiments, the thermal barrier coating may further include an additional metal oxide, such as titania.

Suitable ceramic thermal barrier coating materials may also include pyrochlores of general formula $A_2B_2O_7$ where A is a metal having a valence of 3+ or 2+ (e.g., gadolinium, aluminum, cerium, lanthanum or yttrium) and B is a metal having a valence of 4+ or 5+ (e.g., hafnium, titanium, cerium or zirconium) where the sum of the A and B valences is 7. Representative materials of this type include gadolinium-zirconate, lanthanum titanate, lanthanum zirconate, yttrium zirconate, lanthanum hafnate, cerium zirconate, aluminum cerate, cerium hafnate, aluminum hafnate and lanthanum cerate.

The thermal barrier coating may include the ceramic thermal barrier coating material in an amount of up to 100 weight percent. In some embodiments, the thermal barrier coatings includes the ceramic thermal barrier coating material in a range from about 95 weight percent to about 100 weight percent and more particularly from about 98 weight percent to about 100 weight percent. The composition of the thermal barrier coating in terms of the type and amount of the ceramic thermal barrier coating materials may depend upon one or factors, including the composition of an underlying bond coat layer (if present), the coefficient of thermal expansion (CTE) characteristics desired for the thermal barrier coating, and the thermal barrier properties desired for the thermal barrier coating.

The thickness of the thermal barrier coating may depend upon the substrate or the component it is deposited on. In some embodiments, the thermal barrier coating has a thickness in a range from about 50% to about 90% of the total thickness of the plurality of layers. In some embodiments, the thermal barrier coating has a thickness in a range of from about 25 microns to about 2000 microns. In some embodiments, the thermal barrier coating has a thickness in a range of from about 25 microns to about 1500 microns. In some embodiments, the thermal barrier coating has a thickness in a range of from about 25 microns to about 1000 microns.

As noted earlier, the thermal barrier coatings typically include pores, channels or other cavities that may be infiltrated by molten environmental contaminants, such as, CMAS. In some instances, these pores, channels, or cavities may be created by environmental damage or the normal wear and tear during operation of the thermal barrier coatings. In some instances, the pores, channels or other cavities in the thermal barrier coating surface may result due to the deposition processes. For example, thermal barrier coatings that are deposited by (air) plasma spray techniques may result in a sponge-like porous structure of open pores in at least the surface of the coating. Similarly, thermal barrier coatings that are deposited by physical (e.g., chemical) vapor deposition techniques may result in a porous structure including a series of columnar grooves, crevices or channels in at least the surface of the coating. Without being bound by any theory it is believed that the porous structure may be one of the factors that provides for strain tolerance by the thermal barrier coatings during thermal cycling. Further, the porous structure may further provide for stress reduction due to the differences between the coefficient of thermal expansion (CTE) of the coating and the CTE of the underlying bond coat layer/substrate.

The coatings described herein may be disposed over the aforementioned bond coat or directly onto the substrate depending upon the desired application. The type of substrate may depend in on part on the turbine component. Non-limiting examples of suitable substrates include metals, metal alloys, or combinations thereof. In certain embodiments, the substrate includes an alloy of nickel, cobalt, iron, or combinations thereof. For example, the substrate may include a high temperature, heat-resistant alloy, e.g., a superalloy. Non-limiting examples of suitable high temperature nickel-based alloys include Inconel®, Nimonic®, Rene® (e.g., Rene® 80, Rene® 95 alloys), Udimet®, or combinations thereof. Moreover, other materials appropriate for use at high temperatures, such as ceramics and ceramic-matrix composites, are also suitable for use as the substrate. One example is a composite that includes silicon carbide as a matrix, with a reinforcing phase of silicon carbide.

The article may further include a bond coating (also referred to as a "bond coat") disposed between the substrate and the thermal barrier coating. The bond coating may be formed from a metallic oxidation-resistant material that protects the underlying substrate and enables the thermal barrier coating to more tenaciously adhere to substrate. Suitable materials for the bond coating include MCrAlY alloy powders, where M represents a metal such as iron, nickel, platinum or cobalt. Other non-limiting examples of suitable bond coat materials include metal aluminides such as nickel aluminide, platinum aluminide, or combinations thereof. Where ceramic matrix composite substrates are employed, the bond coat may include silicon-bearing materials, such as elemental silicon, or silicides. The bond coating may have a thickness in the range of from about 25 microns to about 500 microns.

In some embodiments, the protective coating may be the outermost layer (sometimes also referred to as "top coat layer") in the article. In some other embodiments, the article may further include one or more additional layers disposed on the protective coating to form the top coat layer. Non-limiting examples of suitable top-coat layers include erosion resistant layers.

Referring now to FIG. 1, and in keeping with the embodiments described above, article 100 includes substrate 110 and the plurality of coatings 120 disposed on substrate 110. The plurality of coatings includes thermal barrier coating 122 disposed over substrate 110, and protective coating 124 disposed over thermal barrier coating 122. In the embodiment illustrated in FIG. 1, protective coating 124 overlies and is disposed in immediate contact with thermal barrier coating 122, though in general one or more intermediate layers (not shown) may be disposed between protective coating 124 and thermal barrier coating 122.

Figure 2:
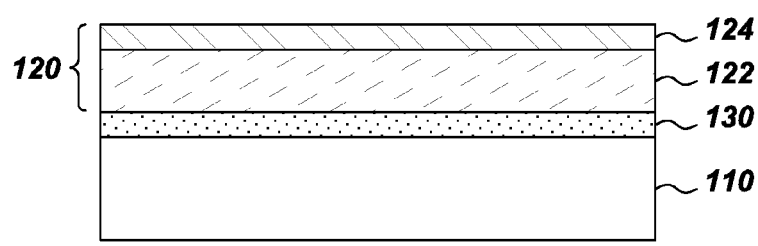

FIG. 2 illustrates another embodiment of the invention similar to FIG. 1, with the addition of a bond coating 130 disposed between the substrate 110 and the thermal barrier coating 122. In the embodiment illustrated in FIG. 2, the thermal barrier coating 122 overlies and is disposed in immediate contact with the bond coating 130, though in general one or more intermediate layers (not shown) may be disposed between these coatings.

Figure 3:
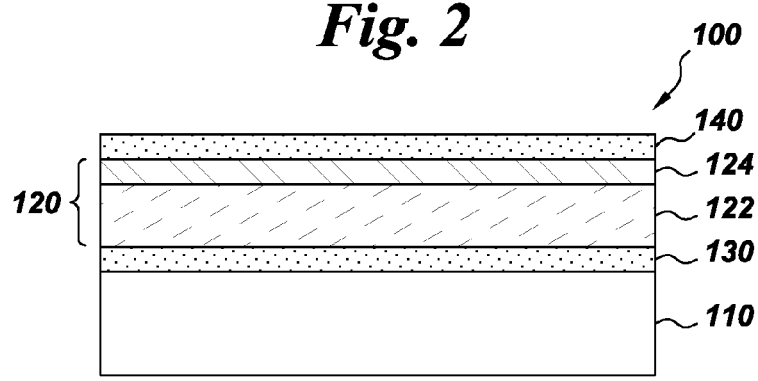

FIG. 3 illustrates another embodiment of the invention similar to FIGS. 1 and 2, with the addition of a top-coat layer 140 disposed on the protective coating 124. Top-coat layer 140 may include, for instance, an erosion resistant material in some embodiments; "erosion resistant materials" in this context means any material having higher erosion resistance than protective coating 124.

Figure 4:
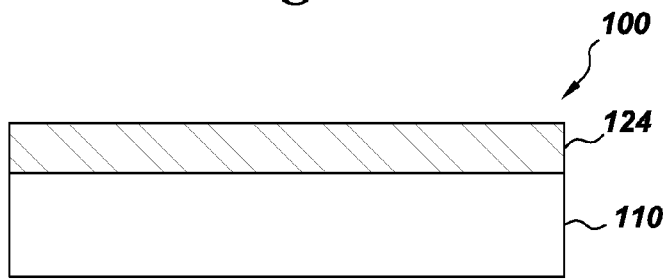

In certain embodiments, as shown in FIG. 4, article 100 includes protective coating 124 is disposed on substrate 110, without an intermediate thermal barrier coating, though an optional intermediate coating, such as a bond coating (not shown) may be disposed between the two coatings.

Whether protective coating 124 is disposed over a thermal barrier coating 122, as in embodiments of the type illustrated in FIGS. 1-3, or simply disposed over substrate 110 as in FIG. 4, protective coating 124 has the physical and chemical characteristics described herein, and, in certain embodiments, protective coating 124 in any of the illustrated arrangements (FIGS. 1-4) includes one or more phases in addition to the rare-earth-bearing perovskite oxide described above. The inclusion of multiple phases provides an opportunity to engineer the balance of properties desired for protective coating 124. Examples of such properties include, but are not limited to, toughness, phase stability, reactivity with CMAS, coefficient of thermal expansion, erosion resistance, and thermal conductivity. For instance, the perovskite oxide of the CMAS-reactive material may not have a desirable level of erosion resistance for use in a particular application, but by including an effective volume fraction of a more erosion-resistant phase in protective coating 124, a desirable balance between CMAS reactivity and erosion resistance may be struck.

In some embodiments, protective coating 124, whether applied to a multiple-layer coating system of the type illustrated in FIGS. 1-3 or in a simpler system such as that illustrated in FIG. 4, includes a first phase and a second phase. The first phase is the perovskite-structured oxide described previously, where the oxide includes a) a rare earth element, b) niobium, tantalum or a combination of tantalum and niobium, and c) oxygen. This first phase, in some embodiments, has a nominal composition of $AB_3O_9$, where A comprises the rare earth element, and B comprises the previously described niobium, tantalum, or combination of tantalum and niobium; as noted previously, particularly desirable examples include, but are not limited to, gadolinium tantalate and gadolinium niobate. The second phase is typically an oxide having a different crystal structure from the first phase, such as an orthorhombic or a tetragonal structure. Such phases are typical of those commonly associated with the first phase via thermodynamic equilibrium among the elements present in the coating. Examples of possible additional phases include an orthorhombic second phase having a nominal composition of $Zr_6M_2O_{17}$, where M comprises niobium, tantalum or a combination of tantalum and niobium, or a tetragonal second phase having a nominal composition of $ABO_4$, where A comprises a rare earth element and B comprises niobium, tantalum, or combination of tantalum and niobium. In certain embodiments, more than two phases are present in protective coating 124, such as embodiments including the perovskite oxide first phase, and further comprising the orthorhombic $Zr_6M_2O_{17}$ and tetragonal $ABO_4$ phases as noted above.

Referring again to FIG. 4, one particular illustrative embodiment is an article 100 having protective coating 124 disposed on substrate 110, where coating 124 includes a perovskite-structured oxide having a nominal composition of $AB_3O_9$, where A comprises gadolinium and B comprises niobium, tantalum or a combination of tantalum and niobium, and wherein the total amount of tantalum and niobium in the perovskite-structured oxide is present in a molar ratio to A of at least 1. The presence of gadolinium in combination with a substantial amount of niobium and/or tantalum is believed to provide a perovskite oxide composition with favorably fast reaction kinetics with CMAS, and desirably may favor the formation of reaction products having comparatively high melting point and high stability in the presence of molten CMAS. As noted in previous embodiments, the perovskite-structured oxide is present in coating 124 in an effective amount to react with a CMAS composition at an operating temperature of the coating, thereby forming a reaction product having one or both of melting temperature and viscosity greater than that of the CMAS composition. In some embodiments, coating 124 comprises at least about 20 volume percent of the perovskite-structured oxide, and in particular embodiments consists essentially of the perovskite-structured oxide. Also as noted previously, other elements may also be included in the A and B sites. In some embodiments, A further comprises calcium, barium, or strontium. Moreover, in some embodiments B further comprises zirconium, hafnium, tungsten, molybdenum, or combinations thereof.

Article 100 may be, for example, any of a wide variety of turbine components (e.g., turbine engine components) that are operated at, or exposed to, high temperatures. Non-limiting examples of suitable turbine engine components include turbine airfoils such as blades and vanes, turbine shrouds, turbine nozzles, buckets, combustor components such as liners and deflectors, heat shields, and augmentor hardware of gas turbine engines, and the like. The coatings described herein may be disposed over a portion, such as an airfoil portion, or over all of substrate 110.

All of the various coatings described herein, such as protective coating 124, thermal barrier coating 122, bond coating 130, and top-coat 140 are readily fabricated using any of the various techniques known in the art. Examples include plasma spraying, physical vapor deposition, chemical vapor deposition, sol-gel techniques, electrophoretic deposition, and other techniques known in the art for depositing ceramic- and/or metal-based materials on surfaces.

EXAMPLES

The following examples are presented to further illustrate non-limiting embodiments of the present invention.

Powders of gadolinium tantalate (a perovskite-structured oxide of nominal formula $GdTa_3O_9$) were synthesized by mixing gadolinium oxide and tantalum oxide powders using wet ball milling, followed by calcining the mixture at about 1400 degrees Celsius for a period of 6 hours. The resulting single-phase $GdTa_3O_9$ powder was ball milled to break down aggregates to form particles. Powders of gadolinium zirconate, a pyrochlore-structured material (nominally $Gd_2Zr_2O_7$) known in the art to be more reactive with CMAS than conventional thermal barrier coatings such as yttria-stabilized zirconia, were made by a similar process as described above, but using gadolinium oxide and zirconium oxide as the starting materials.

A nominal CMAS composition (all percentages in mole percent: 41.6% silica ($SiO_2$), 29.3% calcia (CaO), 12.5% alumina ($AlO_{1.5}$), 9.1% magnesia (MgO), 6.0% iron oxide ($FeO_{1.5}$), and 1.5% nickel oxide (NiO)) was mixed with each of the powders at a volume ratio of 1 part tantalate or zirconate to 6 parts CMAS. Reactivity was studied by heating the powder mixtures in a platinum crucible to 1400 degrees Celsius, holding at this temperature for 15 minutes, and quenching in a cooling air flow. The quenched mass was crushed and the phases formed were analyzed using X-ray diffraction analysis.

Sintered disks of the respective tantalate and zirconate materials, with densities greater than 95% of the respective theoretical densities, were topped with tapes loaded with 8 mg/cm$^2$ of the nominal CMAS composition noted above, heated to 1400 degrees Celsius for 15 minutes, and cooled at a predetermined rate of 10 degrees Celsius per minute. The cross sections across the interfaces of the CMAS and ceramic substrates were polished and analyzed using scanning electron microscopy and energy dispersive x-ray spectroscopy to identify reaction products and the extent of any infiltration of molten phase into the substrate microstructure.

The results demonstrated that the gadolinium tantalate showed very desirable reactivity in the presence of CMAS, and was remarkably effective in mitigating CMAS penetration. First, x-ray diffraction of the quenched reaction product indicated no $GdTa_3O_9$ remained; the entire quantity was converted to a calcium-gadolinium-tantalate-type phase, which conversion consumed a significant amount of CMAS in the process. In contrast, the quenched reaction product of $Gd_2Zr_2O_7$ with CMAS shows formation of an apatite phase and a significant amount of cubic $Gd_2O_3$ stabilized $ZrO_2$, which does not participate in reacting with CMAS. Surprisingly, the perovskite tantalate did not form apatite phase when reacting with CMAS, indicating that a different mechanism of interaction with CMAS is at work in the perovskite system relative to the pyrochlores. Second, cross-sectional microscopy revealed that a zone of reaction/infiltration between CMAS and gadolinium zirconate of about 25 micrometers, while for the gadolinium tantalate this zone was only about 15 micrometers. X-ray diffraction and energy dispersive x-ray spectroscopy confirmed the reaction product formed on the tantalate specimen included a blocky, crystalline oxide containing gadolinium, calcium, and tantalum.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An article comprising:
a substrate; and
a plurality of coatings disposed on the substrate, the plurality of coatings comprising
a thermal barrier coating comprising stabilized zirconia or stabilized hafnia disposed over the substrate; and
a protective coating comprising a calcium-magnesium-aluminum-silicon-oxide (CMAS)-reactive material disposed over the thermal barrier coating, the CMAS-reactive material comprising a perovskite-structured oxide,
wherein the perovskite-structured oxide has a nominal composition of $AB_3O_9$, where A comprises gadolinium and B comprises tantalum;
wherein the protective coating is outermost coating of the plurality of coatings; and
wherein the CMAS-reactive material is present in the plurality of coatings in an effective amount to react with a CMAS composition at an operating temperature of the thermal barrier coating, thereby forming a reaction product having one or both of melting temperature and viscosity greater than that of the CMAS composition.

2. The article of claim 1 wherein A further comprises calcium, barium, or strontium.

3. The article of claim 1 wherein B further comprises a transition metal element, exclusive of the rare earth elements.

4. The article of claim 1 wherein B further comprises zirconium, hafnium, tungsten, molybdenum, or combinations thereof.

5. The article of claim 1, wherein the tantalum is present in the oxide in a molar ratio to A of at least 1.

6. The article of claim 1, wherein the protective coating comprises at least about 20 percent by volume of the perovskite-structured oxide.

7. The article of claim 1, wherein the article comprises a turbine airfoil.

8. The article of claim 1, wherein the protective coating further comprises an orthorhombic phase.

9. The article of claim 8, wherein the orthorhombic phase has a nominal composition of $Zr_6M_2O_{17}$, where M comprises niobium, tantalum or a combination of tantalum and niobium.

10. The article of claim 1, wherein the protective coating further comprises a phase having a tetragonal structure.

11. The article of claim 10, wherein the phase having a tetragonal structure has a nominal composition of $ABO_4$, where A comprises a rare earth element and B comprises niobium, tantalum, or combination of tantalum and niobium.

12. The article of claim 1, wherein the protective coating further comprises (a) an orthorhombic phase with a nominal composition of $Zr_6M_2O_{17}$, where M comprises niobium, tantalum or a combination of tantalum and niobium; and (b) a tetragonal phase with a nominal composition of $ABO_4$, where A comprises a rare earth element and B comprises niobium, tantalum, or combination of tantalum and niobium.

* * * * *